US011992802B2

(12) United States Patent
Beaumont et al.

(10) Patent No.: US 11,992,802 B2
(45) Date of Patent: May 28, 2024

(54) PROCESS AND APPARATUS FOR THE REVERSIBLE ADSORBTION OF CARBON DIOXIDE

(71) Applicant: SKYTREE B.V., Amsterdam (NL)

(72) Inventors: Max Beaumont, Amsterdam (NL); Piotr Thomasz Kasper, Amsterdam (NL); Ian Smith, Amsterdam (NL); Alexander Gunkel, Amsterdam (NL)

(73) Assignee: SKYTREE B.V., Amsterdam (NL)

( * ) Notice: Subject to any disclaimer, the term of this patent is extended or adjusted under 35 U.S.C. 154(b) by 0 days.

(21) Appl. No.: 17/861,648

(22) Filed: Jul. 11, 2022

(65) Prior Publication Data
US 2022/0339575 A1 Oct. 27, 2022

Related U.S. Application Data

(62) Division of application No. 16/463,519, filed as application No. PCT/NL2017/050770 on Nov. 23, 2017, now abandoned.

(30) Foreign Application Priority Data

Nov. 23, 2016 (NL) ....................................... 2017858
Feb. 22, 2017 (NL) ....................................... 2018406

(51) Int. Cl.
*B01D 53/04* (2006.01)
*C01B 32/50* (2017.01)

(52) U.S. Cl.
CPC ..... *B01D 53/0415* (2013.01); *B01D 53/0438* (2013.01); *B01D 53/0446* (2013.01);
(Continued)

(58) Field of Classification Search
CPC ................. B01D 53/04; B01D 53/0415; B01D 53/0438; B01D 53/0446; B01D 53/0462
See application file for complete search history.

(56) References Cited

U.S. PATENT DOCUMENTS 6,156,101 A * 12/2000 Naheiri .............. B01D 53/0476
96/144
7,846,237 B2 * 12/2010 Wright ................ B01D 53/047
96/11
(Continued)

FOREIGN PATENT DOCUMENTS

| EP | 0790920 A1 | 8/1997 |
| WO | WO-2015/123454 A1 | 8/2015 |
| WO | WO-2016/037668 A1 | 3/2016 |

OTHER PUBLICATIONS

International Search Report from corresponding PCT Application No. PCT/NL2017/050770, dated May 8, 2018.
(Continued)

*Primary Examiner* — Youngsul Jeong
(74) *Attorney, Agent, or Firm* — Harness, Dickey & Pierce, P.L.C.

(57) ABSTRACT

An apparatus (10, 110, 210, 310) for the separation and recovery of $CO_2$, from air, by a cyclic adsorption/desorption process using a loose particulate sorbent for gas adsorption. The apparatus has a plurality of adjacent, parallel, spaced-apart layers (24, 124, 224, 324), each having a stiff frame supporting a flexible, gas-permeable fabric enclosure for the sorbent. The gas inlet (14, 114, 214, 314) and outlet (18, 118, 216, 316) of the apparatus are on its axially opposite sides, and each layer (24, 124, 224, 324) extending axially within the apparatus. The recovered $CO_2$ can be either supplied to an enclosed space, recycled to an enclosed space, from which the $CO_2$ had been separated, or vented to the exterior of the latter enclosed space.

2 Claims, 12 Drawing Sheets

(52) U.S. Cl.
CPC .......... *B01D 53/0462* (2013.01); *C01B 32/50* (2017.08); *B01D 2253/102* (2013.01); *B01D 2253/104* (2013.01); *B01D 2253/106* (2013.01); *B01D 2253/108* (2013.01); *B01D 2253/202* (2013.01); *B01D 2253/206* (2013.01); *B01D 2256/22* (2013.01); *B01D 2257/504* (2013.01); *B01D 2259/4009* (2013.01); *B01D 2259/40096* (2013.01)

(56) References Cited

U.S. PATENT DOCUMENTS

| | | | |
|---|---|---|---|
| 2009/0007779 A1* | 1/2009 | Coignet | A01G 9/18 47/17 |
| 2011/0146487 A1* | 6/2011 | Celik | B01D 53/0407 96/121 |
| 2014/0305309 A1 | 10/2014 | McKenna et al. | |
| 2016/0023186 A1 | 1/2016 | Baldinger | |
| 2016/0074803 A1 | 3/2016 | Gebald et al. | |

OTHER PUBLICATIONS

Written Opinion of the International Searching Authority from corresponding PCT Application No. PCT/NL2017/050770, dated May 8, 2018.

Office Action (Non-Final) from corresponding U.S. Appl. No. 16/463,519, dated Oct. 1, 2021.

Office Action (Final) from corresponding U.S. Appl. No. 16/463,519, dated Apr. 20, 2022.

Office Action from corresponding Chinese Patent Application No. 2022108328080, dated Sep. 22, 2023.

(Jing) Xindengzi No. 048, 5, 1992.

* cited by examiner

PROCESS AND APPARATUS FOR THE REVERSIBLE ADSORBTION OF CARBON DIOXIDE

CROSS-REFERENCE TO RELATED APPLICATIONS

This application is a divisional application of U.S. patent application Ser. No. 16/463,519, filed on 23 May 2019, which is a national phase entry of PCT Application No. PCT/NL2017/050770, filed on 23 Nov. 2017, which claims priority to Netherland Patent Application Nos. 2017858, filed on 23 Nov. 2016, and U.S. Pat. No. 2,018,406, filed on 22 Feb. 2017. The entire disclosure of the applications identified in this paragraph is incorporated herein by references.

TECHNICAL FIELD

This invention relates to a process and apparatus for separating and optionally recovering a gaseous component (e.g., $CO_2$) from a gas stream, such atmospheric or outdoor air or air inside an enclosed space such as in a building, e.g., in one or more rooms of a house or office building or in a greenhouse, or in a vehicle, e.g., a car, ship, truck, airplane or bus, or an exhaust gas from a chemical (e.g., combustion) and/or biological process. This invention particularly relates to a process and apparatus for separating and optionally recovering $CO_2$ from air by diffusion of air through an amine-containing particulate substrate which can be processed to selectively adsorb and subsequently desorb $CO_2$. This invention also particularly relates to a process and apparatus for separating and removing $CO_2$ from outdoor air or air in an enclosed space, e.g., in a greenhouse or a car, and then either providing that $CO_2$ to the enclosed space or venting that $CO_2$ to the outdoors.

BACKGROUND OF THE INVENTION

Gas separation by adsorption on a suitable chemical substrate has many applications in industry, for example for removing and optionally recovering a specific component from a gas stream, where the desired product can either be the component removed from the gas stream, the remaining depleted gas stream, or both. Thereby, trace components as well as major components of the gas stream can be targeted by the adsorption process. One important gas separation process involves capturing carbon dioxide ($CO_2$) from gas streams, e.g., from flue gases, exhaust gases, industrial waste gases, or atmospheric air. WO2010.027929 A1 and WO2010/151271A1 describe porous monolithic structures containing an amine for reversible adsorption and separation of $CO_2$ from a combustion process gas stream. WO2010/091831 A1 describes fabrics of fiber filaments containing an amine for the reversible adsorption and desorption and subsequent recovery of $CO_2$ from the atmosphere. WO2012/188346 A1 describes a porous matrix of amine functionalized cellulose nanofibers for the reversible adsorption and desorption of $CO_2$ from a gas stream. WO2014/170184 describes a process and apparatus for the reversible adsorption and desorption and subsequent recovery of $CO_2$ from a gas stream, using a loose amine-containing particulate sorbent bed. The sorbent is held in a stack of parallel, spaced apart, self-supporting layers or cartridges, each cartridge extending parallel to the gas stream. Each cartridge has two sheets of a flexible, gas permeable fabric that are mounted on a stiff frame and that form a cavity enclosing the sorbent. During adsorption, the incoming gas stream is forced, under ambient conditions, under pressure, to flow through a sheet forming an inlet face of each cartridge, through the sorbent material in the cavity of the cartridge, and subsequently through a second sheet forming an outlet face of each cartridge. During desorption, the sorbent is heated and subjected to a vacuum.

WO2016/037068 A1 also describes a process and apparatus for the reversible adsorption and desorption and subsequent recovery of $CO_2$ from a gas stream, using a loose amine-containing particulate sorbent bed. The sorbent is held in a stack of parallel, spaced apart, self-supporting layers or cartridges, each cartridge extending perpendicular to the gas stream. Each cartridge has two sheets of a flexible, gas permeable fabric that are mounted on a stiff frame and that form a cavity enclosing the sorbent. The gas stream diffuses through a sheet forming an inlet face of each cartridge, through the sorbent material in the cavity of the cartridge, and subsequently through a second sheet forming an outlet face of each cartridge.

SUMMARY OF THE INVENTION

In accordance with this invention, a process and apparatus are provided for the reversible adsorption and desorption and subsequent recovery of a gaseous component, particularly $CO_2$, of a gas stream, particularly air, from the remainder of the gas stream, using a loose particulate sorbent, advantageously an amine-containing sorbent. The sorbent is held in one or more, parallel stacks of cartridges or layers, each stack containing a plurality of adjacent, parallel, spaced-apart cartridges and each cartridge extending substantially parallel to the gas stream. Each cartridge has a flexible, gas permeable fabric enclosure that is mounted on a stiff frame and that forms a cavity within the frame enclosing a certain amount of the sorbent. During adsorption of the gaseous component, the gas stream diffuses into the cavity of each cartridge through its fabric enclosure, then through the sorbent in the cavity of the cartridge, and then out of the cavity of the cartridge through its fabric enclosure. The invention features specific structures of each cartridge and its cavity containing its sorbent that provide a reversible adsorption of the gaseous component with a very low pressure drop of the gas stream and with a very high mass transfer rate between the gas phase and the surface of the sorbent.

The process and apparatus of this invention for a cyclic adsorption/desorption of a gaseous component of a gas stream utilize one or more, preferably a plurality of, more preferably two, parallel stacks of cartridges. Each cartridge includes a flexible fabric enclosure which holds a quantity of sorbent and is gas permeable but impermeable to the sorbent. The stiff frame of each enclosure holds the cartridges spaced apart and in a self-supporting way in a sealable enclosure. An inlet and an outlet for the gas stream are provided on opposite sides of the sealable enclosure and on opposite sides of the stack(s) of cartridges, so that each cartridge extends parallel to the path of the gas stream between the inlet and outlet. The gas stream passes between the cartridges and diffuses through them and through their contents of sorbent as it moves between the inlet and outlet, advantageously along a serpentine flow path. The diffusion of the gas stream along a serpentine flow path provides a very low pressure drop system which does not require pumping of the gas stream.

Advantageously, the sealable enclosure comprises a rigid vacuum chamber, to which the inlet and outlet of the gas stream are connected. Advantageously, the cartridges are separated from each other by 0.3-0.7 cm, especially 0.4-4 cm.

Advantageously, at least 10, more advantageously at least 20, still more advantageously at least 25-40, cartridges are provided between the inlet and outlet of the gas stream.

DETAILED DESCRIPTION OF THE INVENTION

Figure 1:
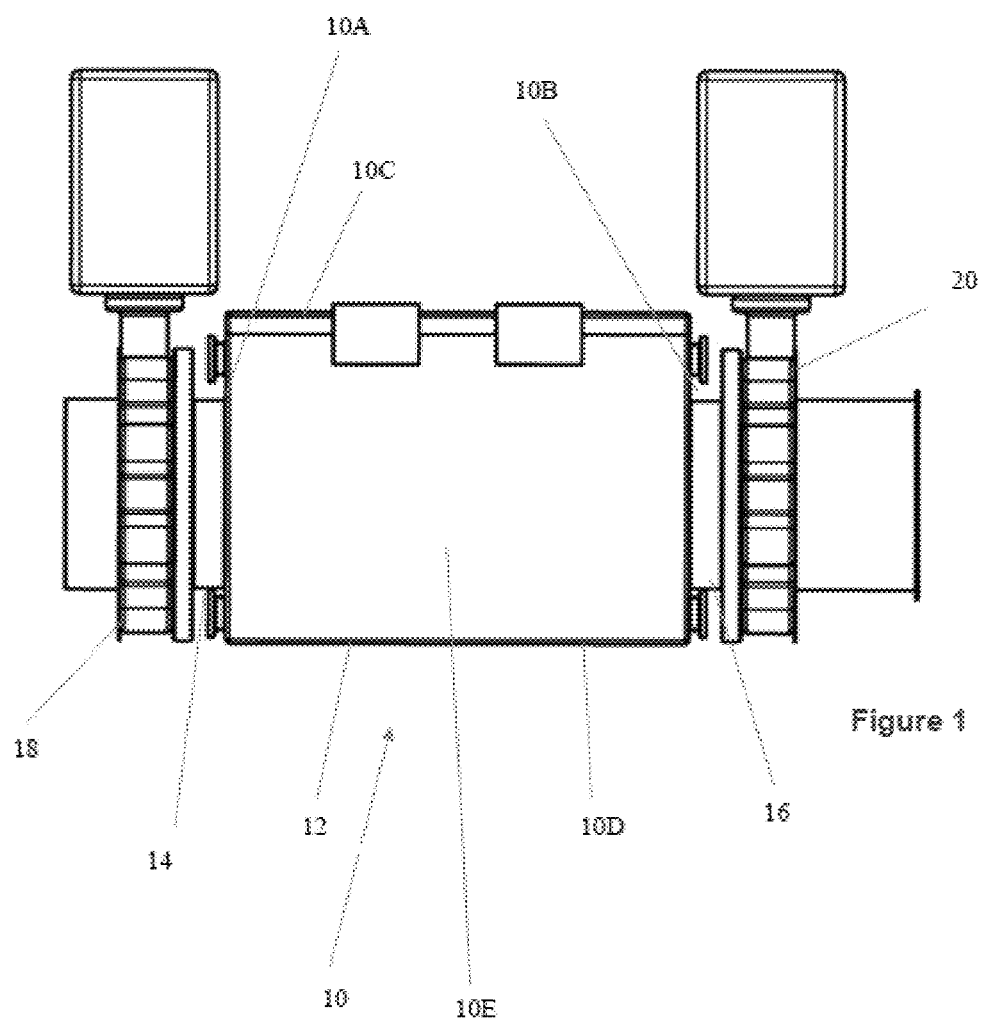
FIGS. 1-3 show a sealable enclosure with a rigid vacuum chamber of this invention. Sealable inlet and outlet valves are mounted on opposite axial ends of the vacuum chamber.
Figure 2:
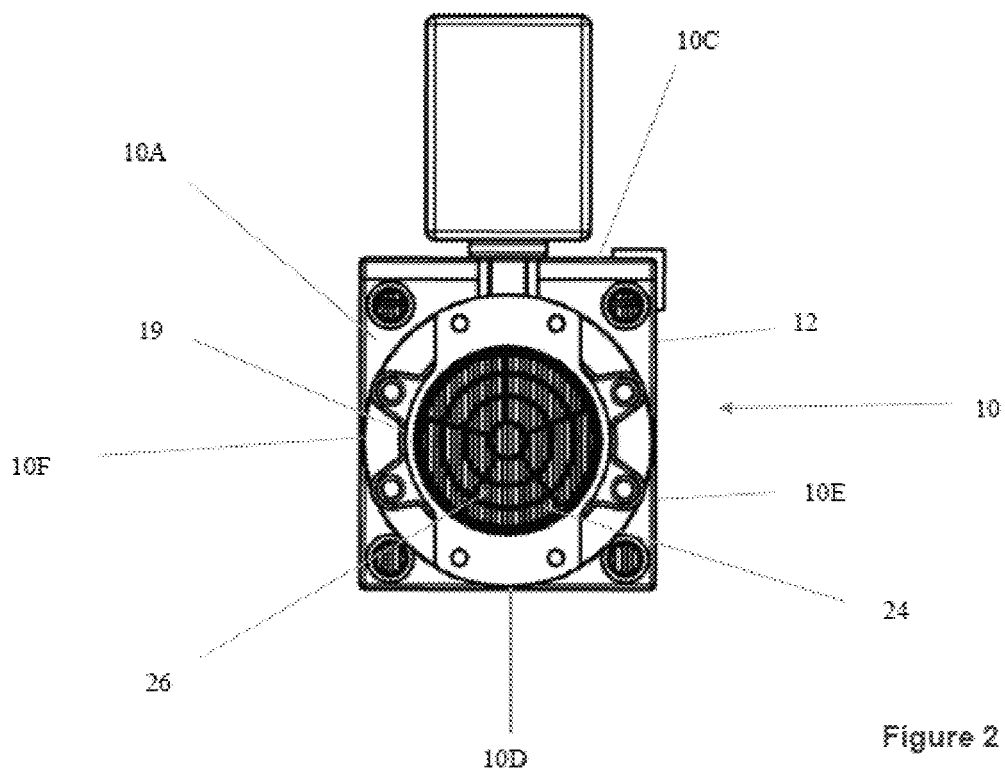
Figure 3:
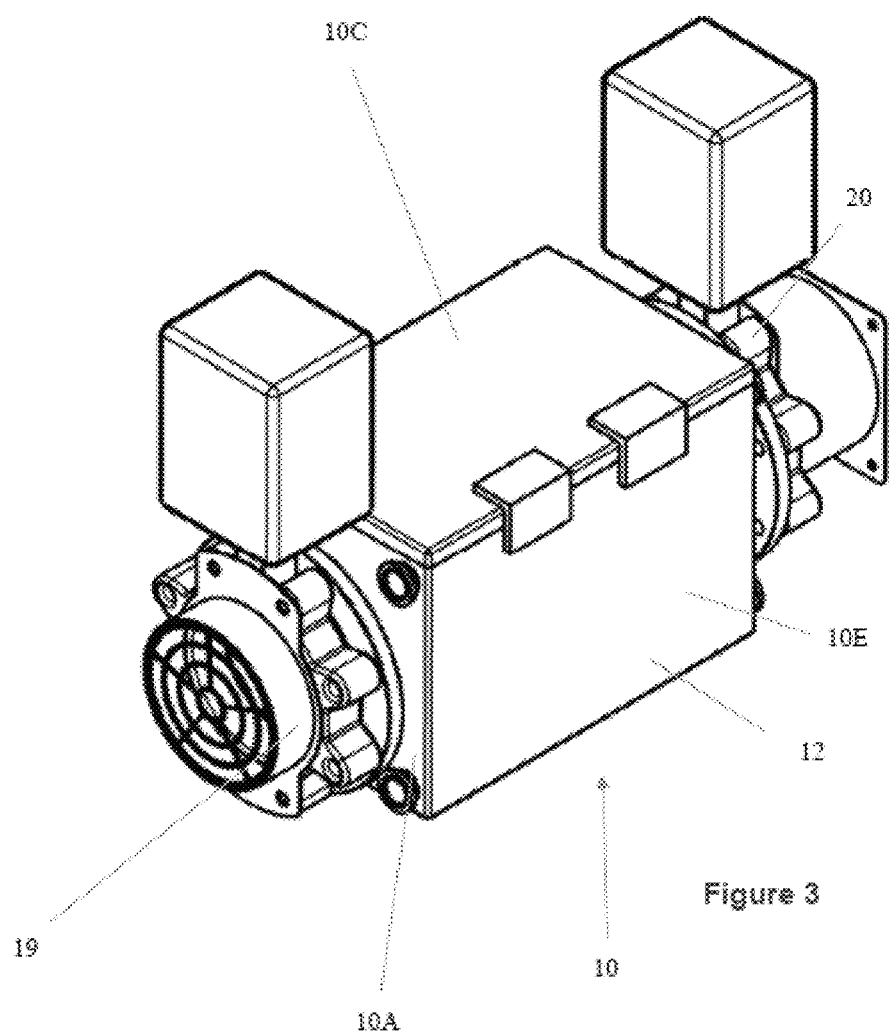
Figure 4:
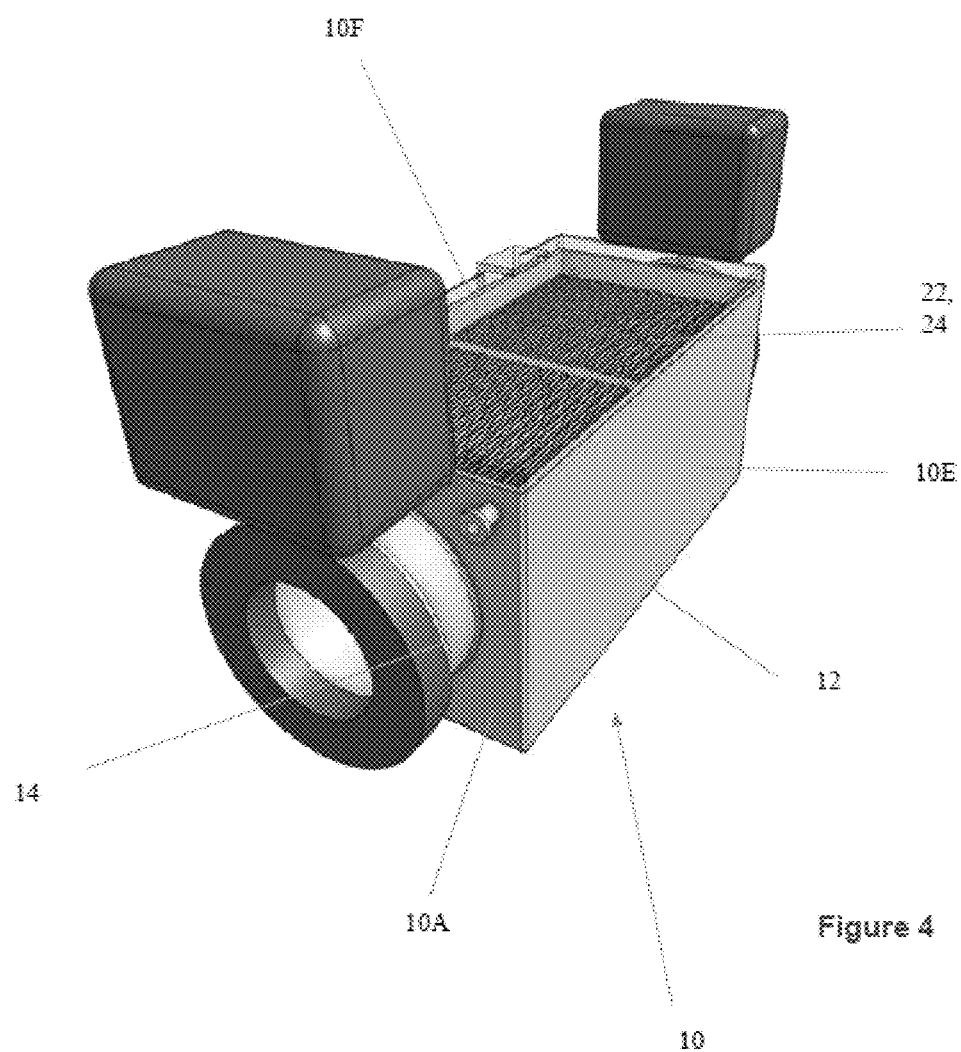
FIG. 4 shows the sealable enclosure of FIG. 1-3 (with the top wall of its vacuum chamber removed), containing two laterally-extending, axially spaced-apart, parallel stacks of axially- and vertically-extending, laterally spaced-apart, parallel cartridges or layers. Each stack contains a plurality of adjacent, parallel, laterally spaced-apart cartridges, and each cartridge encloses a measured amount of a particulate sorbent for a gaseous component (e.g., $CO_2$) of a gas stream (e.g., air) in accordance with this invention.

Shown in the Figures are preferred sealable enclosures of this invention for a process of: i) separating a desired gaseous component, particularly $CO_2$, of a gas stream, particularly air, from the remainder of the gas stream, using a loose particulate sorbent (not shown) for the desired gaseous component, preferably a sorbent to which the desired gaseous component will adhere in much more significant amounts than will other components of the gas stream, more preferably an amine-containing sorbent; and ii) subsequently recovering the desired gaseous component. During adsorption of the gaseous component, the gas stream diffuses into the cavity of each cartridge through its fabric enclosure, then through the sorbent in the cavity of the cartridge, and then out of the cavity of the cartridge through its fabric enclosure.

The sealable enclosure holds a plurality of parallel, spaced apart, self-supporting cartridges, each cartridge extending substantially parallel to the gas stream through the enclosure. Each cartridge has a cavity, within it, that can hold a measured quantity of the sorbent. For this purpose, the sorbent can be enclosed in a fabric material (not shown) which is gas permeable but impermeable to the sorbent and can form the lateral sides of each cartridge. The top, bottom and axial edges of this fabric enclosure can be held in a rigid plastic frame forming the top, bottom and axial sides of each cartridge. The fabric enclosure can comprise a fabric pouch or a single sheet of fabric, folded at the bottom of the cartridge, or two substantially parallel sheets of fabric, forming the lateral sides of the cavity of the cartridge that holds the sorbent.

The sorbent can be any conventional sorbent, to which the desired gaseous component will preferentially adhere (relative to other gaseous components of the gas stream) but which can be recovered from the sorbent, preferably using mild conditions. The sorbent is preferably adapted to adsorb preferentially the desire gaseous component under ambient conditions, e.g., at 20-40° C., and at 0.7 to 1.3 bar absolute pressure, and subsequently to be regenerated under mild conditions, preferably by being heated, e.g., up to 50 to 120° C., and preferably also being subjected to reduced pressure, e.g., 10-300 $mbar_{abs}$. While inorganic sorbents can be useful, because they typically have high physical strength, they generally require high temperature and pressure for adsorption and/or desorption of a gaseous component. For this reason, such sorbents are not preferred and are generally unsuitable for household use or other applications under mild conditions. Activated carbon, e.g. DEA embedded activated carbon, can also be used. However, such sorbents are generally not sufficiently stable for a prolonged use and tend to degrade under room conditions after two months.

Preferred sorbents of this invention for adsorbing $CO_2$ are light and porous, solid particles or beads provided with an amine functionality and having high surface areas per volume. Suitable particles include zeolites (also referred to as molecular sieves), ceramic based materials, such as alumina, silica, and silica alumina, titanium dioxide, silica gel, activated carbon and organic polymers, such as polystyrene, modified by amines, such as Diethanolamine (DEA) or Polyethylenimine (PEI) or a divinylbenzene based amine or ethylenediamine. More preferred are sorbents that can be readily regenerated for reuse, particularly when recovering the adsorbed $CO_2$. For example, the sorbent can be an amine-modified particular material, based on cellulose, such as an amine-modified nanofibrilated cellulose as described in WO2014/170184 A1 and WO2010/091831 A1 or ion exchange resins having benzyl amine groups as described in WO00/02643 A1.

Still more preferred for adsorping and desorping $CO_2$ are polymeric sorbents having a primary amino functionality as described in WO2016/037688 A1 Even more preferred as sorbent is a free base amine bead functionalized with the primary amine benzyl amine and supported on a porous polyester structure crosslinked with divinyl benzene, particularly a sorbent which is in the form of spherical beads of polystyrene, cross-linked with 8-10% divinyl benzene modified with methylamine.

The polymeric sorbent preferably has an activity expressed as total capacity of at least 2 eq/l, more preferably at least 2.1 and yet more preferably at least 2.2. It preferably has a uniformity coefficient of at most 1.9, more preferably at most 1.8. A preferred sealable enclosure 10 for the process and apparatus of this invention is shown in FIGS. 1-9.

As particularly seen from FIGS. 1-4, the sealable enclosure 10 has a vacuum chamber 12 with an inlet 14 for a raw gas stream and an outlet 16 for a purified gas stream on its opposite axial walls 10A and 108 respectively. The inlet 14 and outlet 16 are provided with conventional sealable valve mechanisms 18 and 20, respectively, such as for instance conventional butterfly valves. A conventional compressor or fan, preferably just a fan 19, is connected to the sealable valve mechanism 18 to provide a flow of a gas stream, preferably air, into the vacuum chamber 12 through its inlet 14. A conventional vacuum or extraction pump 21 is connected to the sealable valve mechanism 20 to remove a gas, preferably $CO_2$-depleted air and/or $CO_2$, from the vacuum chamber 12 through its outlet 16. Preferably, the vacuum chamber 12 and its valve mechanisms 18 and 20 are vacuum tight.

The vacuum chamber 12 of the sealable enclosure 10 contains one or more, preferably a plurality, more preferably two, parallel, axially spaced-apart stacks 22 of cartridges 24. Each stack contains a plurality of parallel adjacent, self-supporting, spaced-apart layers or cartridges, generally 24, as shown in FIGS. 2, 4, 8 and 9. Each stack 22 is preferably spaced away from the lateral walls 10E and 10F of the vacuum chamber 12. Preferably at least 10, more preferably at least 20, still more preferably at least 25-40, cartridges 24 are provided between the inlet 14 and outlet 16 of the vacuum chamber 12. Each stack 22 preferably contains at least 10, more preferably 15 or more, cartridges are provided between the inlet and outlet of the gas stream. The top wall 10C of the sealable enclosure is removable to allow for easy insertion of the stacks 22 of cartridges 24.

Figure 8:
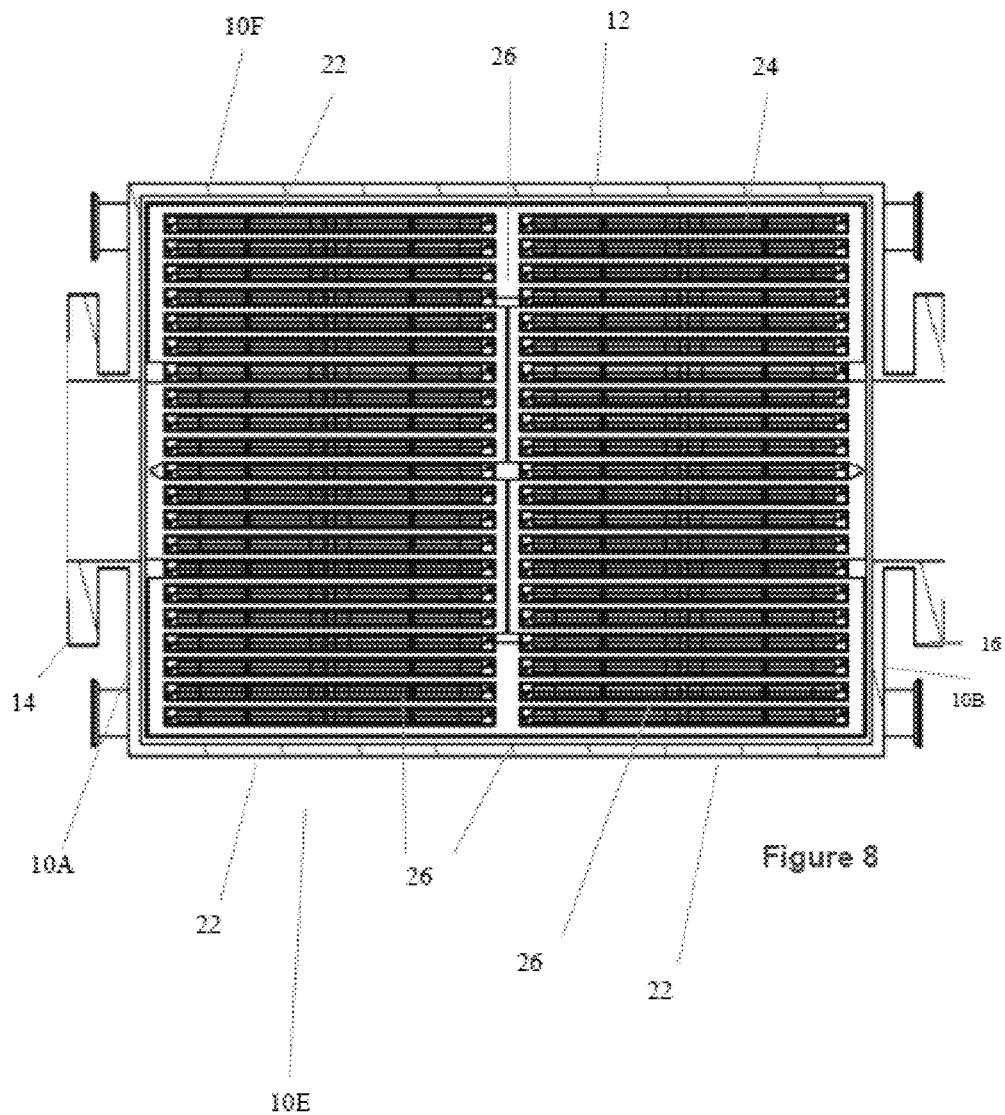
FIG. 8 is a top plan view of the open vacuum chamber as shown in FIG. 4 and showing its two laterally-extending, axially spaced-apart, parallel stacks of axially- and vertically-extending, laterally spaced-apart, parallel cartridges.
Figure 9:
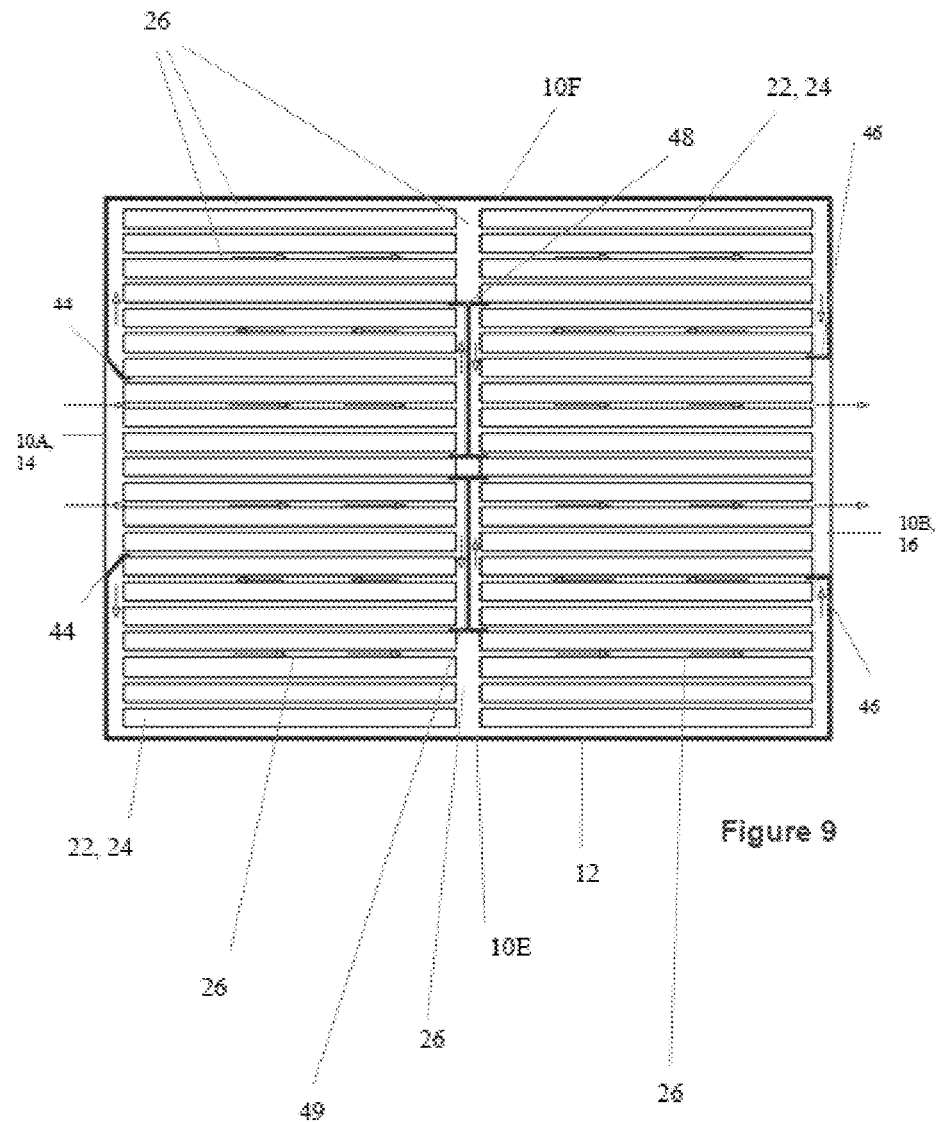
FIG. 9 is a simplified top view of the open vacuum chamber, like FIG. 8, showing (with arrows) a preferred flow of a gas stream axially through the vacuum chamber between its inlet and outlet and between the stacks of cartridges of this invention, so as to maximize the diffusion of the gas stream through the sorbent in the cartridges. Baffles are provided in the vacuum chamber for directing the flow of gas in a preferred serpentine flow pattern.

Each cartridge 24 in each stack 22 in the vacuum chamber 12 has an essentially planar configuration and encloses a particulate sorbent (not shown) for a gaseous component (e.g., $CO_2$) of a raw gas stream in accordance with this invention. Each cartridge 24 extends axially in the sealable enclosure 10, i.e., substantially parallel to the flow of the gas stream through the sealable enclosure between its inlet and outlet 14, 18. Each cartridge also preferably extends vertically in the sealable enclosure 10, between its top and bottom walls 10C and 10D respectively. If desired, each axially-extending cartridge 24 could instead extend laterally in a vertically-extending stack 22 (not shown). As shown in FIGS. 8 and 9, the preferred axially- and vertically-extending cartridges in each preferred laterally-extending stack 22 are spaced laterally apart from one another, so as to form channels 26 for the flow of gases through the sealable enclosure Spacers (not shown) can be provided between the cartridges to ensure that the channels 26 remain open during the process of this invention. Preferably, the cartridges are separated from each other by 0.3-0.7 cm, especially 0.4-4 cm to adequately keep open the channels 26.

Figure 5:
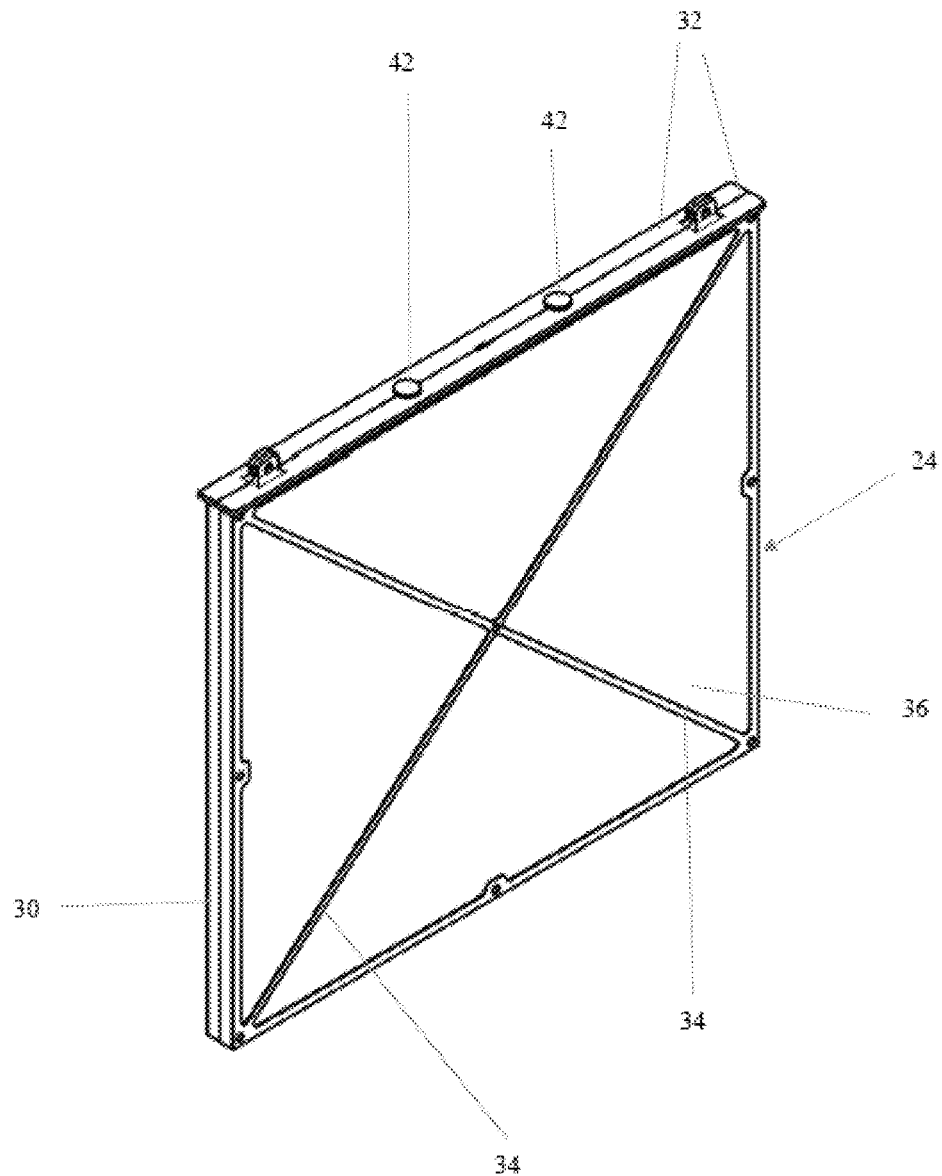
FIG. 5 is a perspective view of a single empty cartridge of this invention, adapted to be filled with and hold a measured amount of the sorbent (not shown) for the gaseous component in accordance with this invention. The cartridge features a rigid frame, which can hold the top, bottom and axial sides of a fabric (not shown), enclosing the measured amount of the sorbent. The frame is constructed from two frame members adapted to enclose and hold the fabric enclosure for the sorbent.
Figure 6:
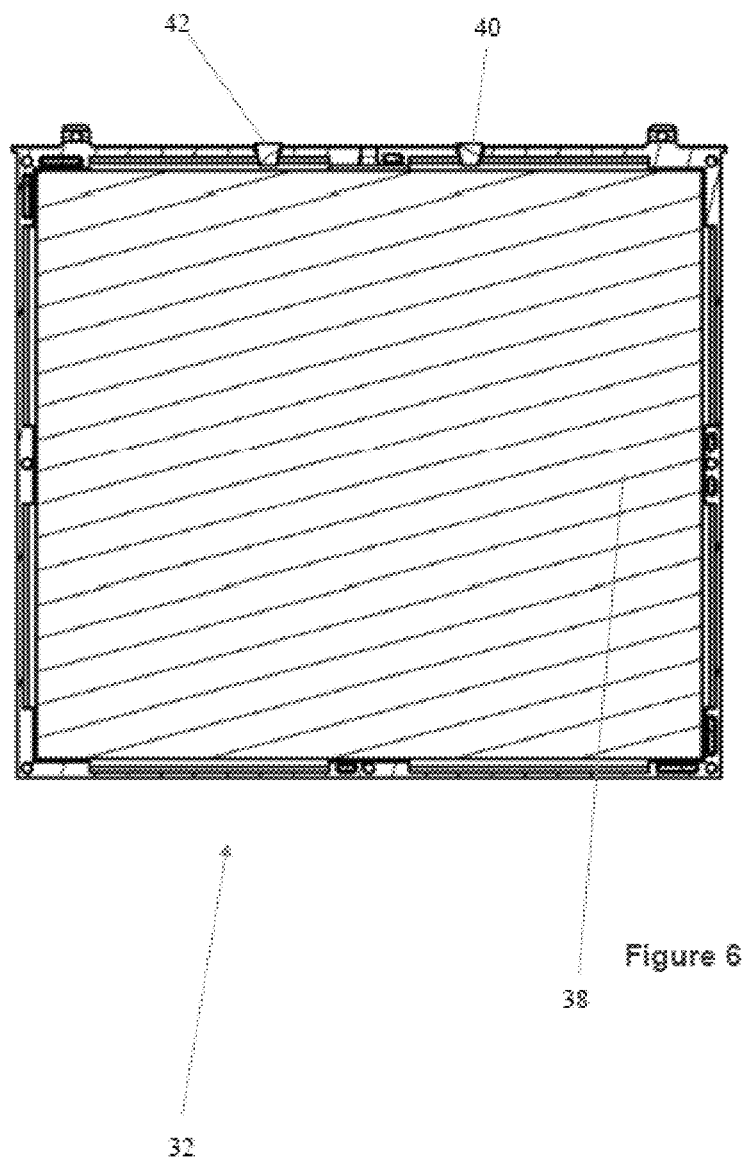
FIG. 6 is a plan view of a frame member of the frame of the cartridge of FIG. 5, containing a flat heating element extending substantially the full width and length of the cartridge.
Figure 7:
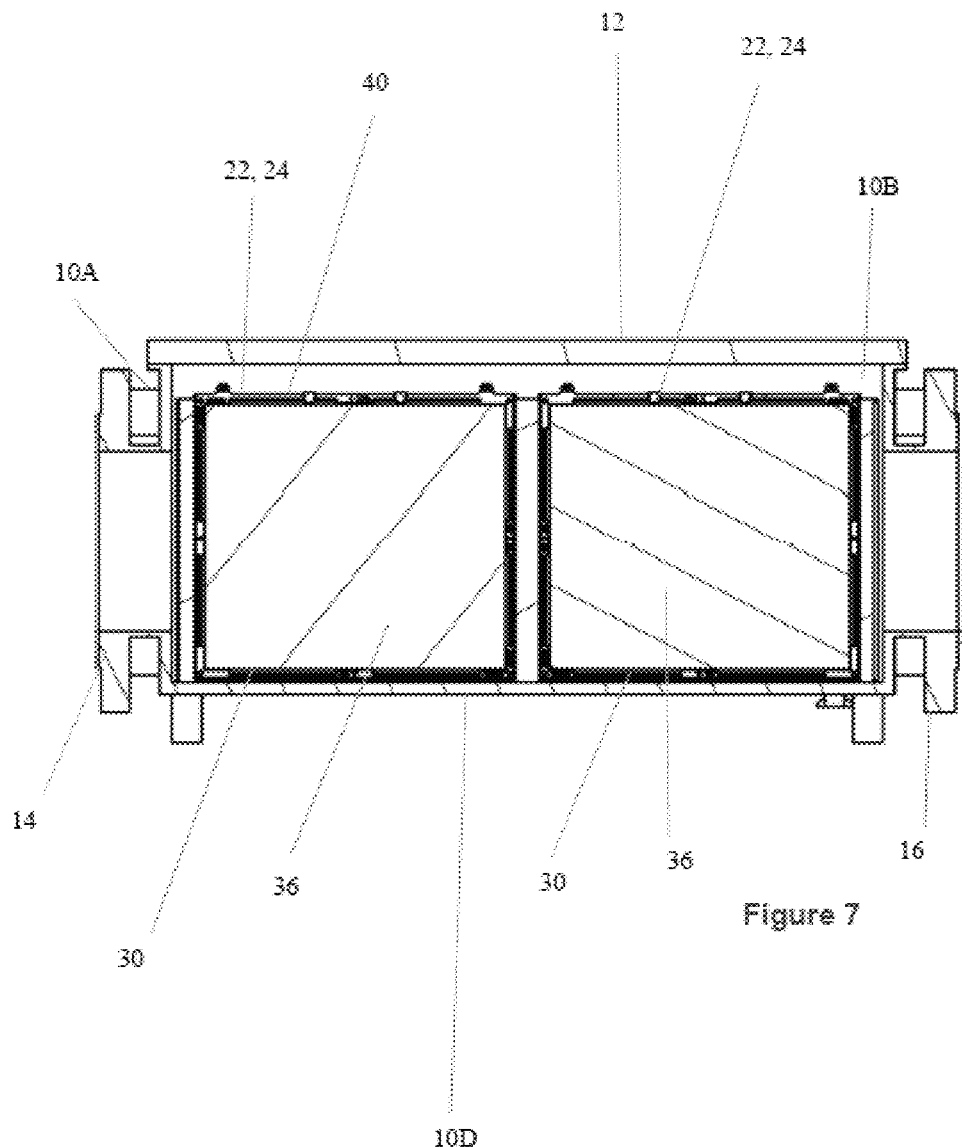
FIG. 7 is a sectional view, taken axially along the middle of the vacuum chamber of the sealable enclosure as shown in FIG. 3, showing cartridges in two parallel stacks of parallel cartridges of this invention, adapted to be filled with and hold measured amounts of the sorbent (not shown) in accordance with this invention.

Each cartridge 24, as shown in FIGS. 5-7, includes an axially-extending and vertically-extending, substantially flat, stiff frame 30 which is open at its lateral and vertical middle and which preferably has a rectangular, particularly square, shape. Each frame 30 is made from a stiff, mechanically stable, lightweight material, preferably a plastic. The size and shape of each frame 30 preferably is somewhat smaller than the lateral cross-section of the sealable enclosure 10, so that the channels 26 are open adjacent the top and bottom walls 10C and 100 and the opposite lateral walls 10E and 10F of the sealable enclosure. Each frame 30 can be constructed from two identical, substantially flat, stiff frame members 32 which are open at their axial and horizontal or vertical, preferably vertical, middle and which have the shape of the frame. The frame members 32 can be attached to one another to form the frame 30 in a conventional manner, e.g., by adhesively bonding or welding them together. Preferably, each frame member 32 has a plurality of reinforcing ribs 34 extending across the open portions of the frame and attached to its opposite sides. As shown in FIGS. 5 and 7, a pair of ribs 34 preferably extend diagonally across each frame member 32 from the corners of the frame, and these ribs are attached to each other where they cross. Each cartridge 24 has a cavity 36 within the open portions of its frame 30, between its frame members 32, which can hold a measured quantity of the sorbent (not shown). For this purpose, the sorbent can be enclosed in a flexible fabric material (not shown) which is gas permeable but impermeable to the sorbent. The top, bottom and axial edges of this fabric enclosure for the sorbent can be attached to and held by, e.g., glued to, the frame 30, within its frame members 32. Thereby, the frame 30 can enclose the fabric and the sorbent held therein. The fabric enclosure for the sorbent can comprise an axially-extending and vertically-extending fabric pouch or a single axially-extending sheet of fabric, folded along one side of the cartridge, or two substantially parallel axially-extending sheets of fabric, forming the lateral sides of the cavity of the cartridge that holds the sorbent. The flexible fabric can be a woven or nonwoven textile material, preferably based on polymeric fibers or yarns, particularly a woven fabric made from PET and/or PE fibers, or from metal or metal alloy wires, such as typically employed for a metal meshes. The reinforcing ribs 34 of the frame members 32 of each frame 30 of each cartridge 24 are located on opposite lateral sides of the cavity 36 and its fabric enclosure (not shown). Thereby, the reinforcing ribs 34 can serve to maintain the essentially planar structure of each cartridge 24 and keep its fabric enclosure from bulging laterally outward of the frame members 32 of the cartridge under the weight of the sorbent content of the cartridge.

The individual frame members 32 can be produced in a conventional manner, for example, by injection molding of a plastic material. Similarly, the frames 30 can be produced as one piece by injection molding a plastic material to a fabric which can form an enclosure for a cavity 36 in the frame to hold a measured quantity of the sorbent. In this regard, a frame can be injection molded directly to the top, bottom and axial edges of a suitable fabric construction to form the enclosure for the cavity 36 for holding the sorbent in the frame of a cartridge 24. A suitable fabric construction could be: i) a fabric pouch or ii) a single folded sheet of fabric with two substantially parallel, fabric portions or iii) two separate, substantially parallel, fabric sheets, each of which could form a fabric enclosure, forming a cavity 36 in the frame to hold the sorbent.

One or more cartridges 24, preferably all or most cartridges, are preferably provided with a heat exchange element, preferably in the form a heating element 38. As shown in FIG. 6, the heating element 38 is preferably a flat, electrical heating element extending across the open middle, preferably the axial and vertical middle, of the frame 30 of the cartridge. However, heat-exchange elements, connected to a waste heat recovery system, could instead be provided in the cartridges.

One edge, preferably the top, of the frame 30 of each cartridge 24 is preferably provided with one or more holes 40, into which loose sorbent particles can be poured to fill the cavity 36 in the cartridge, formed by its fabric enclosure. Each hole 40 is adapted to be closed in a conventional manner, e.g., by heat-sealing a plug 42 in the hole, after filling the cartridge with the sorbent, in this regard, a sorbent of this invention preferably has good flowability properties for ease of filling each cartridge with sorbent through the holes 40. The vacuum chamber 12 of this invention features one or more laterally- or vertically-extending, preferably laterally-extending, stacks 22, each containing a plurality of axially-extending cartridges 24 of this invention. The cartridges in each stack are laterally- or vertically-spaced apart, preferably laterally-spaced apart. As a result, a serpentine channel 26 is provided, extending through the stack(s) 22 of cartridges 24 for the flow of a gas stream through the sealable enclosure. In this regard, each laterally- or vertically-spaced apart, preferably laterally-spaced apart, stack 22 preferably is laterally- or vertically-spaced way, preferably laterally-spaced away, from the adjacent, front and rear walls or top and bottom walls, preferably front and rear walls 10E and 10F, of the vacuum chamber and is axially spaced away from the opposite axial walls 10A and 108 of the vacuum chamber to maximize the length of the serpentine gas flow channel 26. In a preferred vacuum chamber 12, pairs of axially-extending baffles 44 and 46, respectively, are preferably provided adjacent to, and on laterally opposite sides of, each of the inlet and outlet 14 and 16 of the vacuum chamber 12, and one or more laterally- and vertically-extending baffles 48 and 49 are provided between the inlet and outlet 14 and 16. These baffles 44, 46, 48 and 49 preferably extend vertically from the bottom wall 10D to the top wall 10C of the vacuum chamber 12 and provide a serpentine flow channel for movement of gas through the vacuum chamber. In this regard, the pair of baffles 44 direct movement of the initial gas stream from the inlet 14 toward the outlet 16 and also direct movement of a gas stream, from which a gaseous component, particularly $CO_2$, has been partially removed, laterally away from the inlet 14. The pair of baffles 46 direct movement of the final gas stream, from which the gaseous component has been removed, toward the outlet 16 and also prevent movement of gas, from which the gaseous component, has been partially removed, laterally toward, and outward of, the outlet 16. The baffles 48 and 49 channel gas, from which the gaseous component, has been partially removed, laterally away from the inlet 14 in opposite lateral directions and laterally toward the outlet 16 in opposite lateral directions. A preferred vacuum chamber 12 with two or more laterally-extending, stacks 22 of cartridges 24 preferably has a pair of laterally- and vertically-extending baffles 48 and 49 on opposite lateral sides of the vacuum chamber 12, between each stack 22, to channel movement of gas, from which the gaseous component, particularly $CO_2$, has been partially removed, laterally within each stack and between the adjacent stacks as shown in FIG. 9.

An important advantage of the sealable enclosure 10 of this invention is that during adsorption of a gaseous component, particularly $CO_2$, of a gas stream, the gas stream diffuses into, rather than being forced through.

the cavity 36 of each cartridge 24 through its fabric enclosure, then through the sorbent in the cavity of the cartridge, and then out of the cavity of the cartridge through its fabric enclosure.

Another advantage of the sealable enclosure 10 of this invention is that its very thin cartridges 24 containing the particulate sorbent can be stacked in a relatively compact manner as shown in FIGS. 8-10, so that the length of the serpentine or zig-zag flow path of a gas stream through the sealable enclosure is large while the dimensions of the sealable enclosure are relatively small. For example, if 1 $m^3$ of sorbent is provided in a single packed bed with a bed length of 1 cm, this will result in a bed cross section area of 100 $m^2$. However if the same amount of material is arranged in 100 stacked layers, each of 1 cm thickness and 1 $m^2$ area, with 1 cm wide inlet and outlet channels between them, this will result in overall stack dimensions of 1 m×1 m×2 m, which is much more compact and has therefore a much smaller footprint. At the same time, the stacked arrangement significantly facilitates gas distribution. While even distribution of a gas stream towards the bottom area of a 100 $m^2$ large bed will require excessive ducting, the ducting required to guide a gas flow towards the inlet of a 1 m×1 m×2 m stack will be relatively small. In this regard, the stacking of the cartridges 24 to provide a serpentine flow path of a gas stream through the sealable enclosure produces a more uniform pressure gradient in the sealable enclosure. This results in a more uniform diffusion of the gas stream through the sorbent in the cartridges, which ensures the most efficient utilization of the sorbent during the adsorption process. In fact, the diffusion of the gas stream along a serpentine flow path in accordance with this invention provides a very low pressure drop system which does not require pumping of the gas stream.

Still another advantage of the sealable enclosure 10 of this invention is that due to the fact that that its cartridges 24 containing sorbent are stacked as individual layers (as opposed to prior art structures that are, for example, extruded or cast from a single material), the stack 22 of cartridges can be made from various materials and various material combinations. For instance, a frame 30 defining the geometry of each cartridge can be made from a stiff, mechanically stable, lightweight material, while the flexible fabric material enclosing the sorbent material layer can be made from a different material with the desired permeability properties for the air flow and the sorbent material particles. Likewise, the frame 30 and fabric enclosing the sorbent can be made from materials which compensate differently for changes in temperature or pressure in the salable enclosure.

The sealable enclosure 10 of this invention can be used in a cyclic adsorption/desorption process to: i) separate a desired gaseous component, particularly $CO_2$, of a gas stream, particularly atmospheric or outdoor air, from the remainder of the gas stream, using a particulate sorbent; and ii) subsequently desorp the desired gaseous component from the sorbent and recover the desired gaseous component. During the adsorption step, the gas stream is forced by a compressor or fan, preferably a fan 19, to flow through the valve mechanisms 18 and 20 at the inlet 14 and outlet 16 of the sealable enclosure and through its vacuum chamber 12, preferably under ambient conditions, more preferably at 20-40° C., and at 0.7 to 1.3 bar absolute pressure, whereby a portion of the desired gaseous component contained in the gas stream is bound at the surface of the sorbent in the stack 22 of cartridges 24 in the vacuum chamber. During the subsequent desorption step, the flow of the gas stream through the sealable enclosure is stopped, and the sorbent in the stack 22 of cartridges 24 is heated, preferably under mild conditions, more preferably up to 50 to 120° C., and is preferably also subjected to reduced pressure, preferably 10-300 $mbar_{abs}$ by a vacuum pump 21. This provides a gas stream effluent from the sealable enclosure that is highly concentrated in the desired gaseous component, particularly $CO_2$. Alternatively during the subsequent desorption step, the flow of the gas stream, particularly atmospheric air, through the sealable enclosure is continued, and the sorbent in the stack 22 of cartridges 24 is heated, preferably under mild conditions, more preferably up to 50 to 120° C. This provides a gas stream effluent from the sealable enclosure that is much less concentrated in the desired gaseous component, particularly $CO_2$. Heating of the sorbent can be carried out in any conventional manner, such as by passing a heated air stream through the sorbent and the vacuum chamber 12. Preferably, the sorbent is heated by means of a heat exchange element, particularly the heating elements 38 in the cartridges 24.

The sealable enclosure 10 of FIGS. 1-9 is particularly well suited for use in a process for separating and removing $CO_2$ from air in an enclosed or confined space, such as an office, a hotel room, an airplane, an automobile, a truck, or a train carriage. This sealable enclosure 10 is also particularly well suited for use in a process of removing $CO_2$ from air and then providing the $CO_2$ in high concentration to enclosed or confined spaces such as greenhouses (for enhancing plant growth) or vivaria, such as terraria and aquaria (for enhancing aquatic plant growth).

Accordingly, the present invention also relates to a process further comprising providing a stream essentially comprising of the first gas from the desorption process to a further process. Preferably, the further process comprises a chemical conversion process, a process for the growth of plants, and/or a process for the carbonation of a fluid, such as a beverage, or an aquarium, or to chemical processes for the conversion of $CO_2$, such as hydrogenation methanol. Also relevant may be the provision of $CO_2$ for as an inert gas, such as for food packaging preservation, or green houses, or for the buffering of the pH of aqueous fluids. Hence, not only can the process and apparatus advantageously be employed to remove a gas, preferably $CO_2$ from an enclosed or confined space, and thus increase the air quality in the space, but also or alternatively, the process and apparatus may also serve to supply the desorped gas stream to an industrial process.

Figures 10A, 10B:
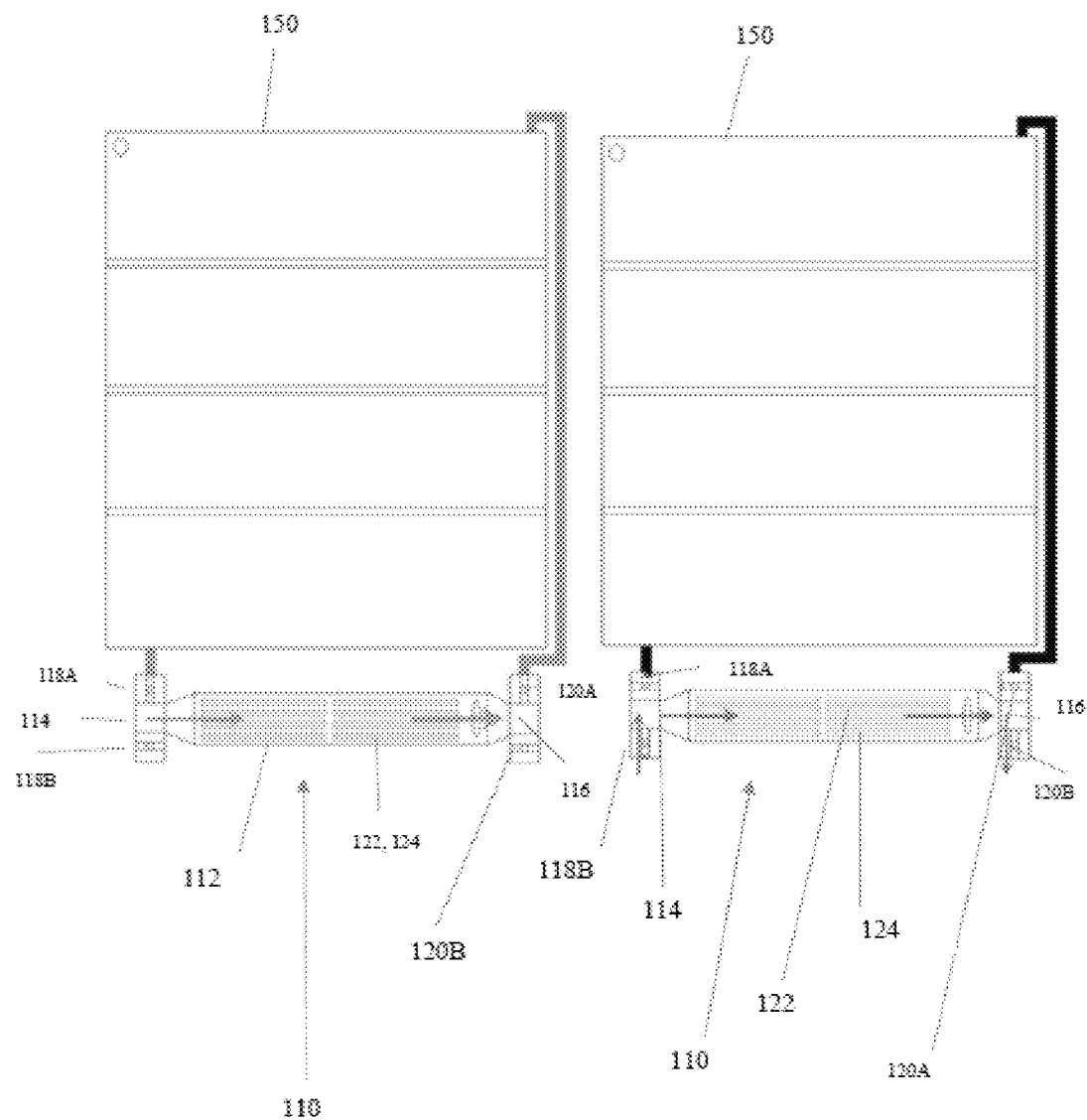
FIGS. 10A and 10B shows schematically the use of an alternative sealable enclosure 110 of this invention for removing $CO_2$ from outdoor air and providing the removed $CO_2$ to an enclosed or confined, interior space, such as of a greenhouse.

In this regard, a lower cost, alternative sealable enclosure 110 of this invention can be used in a somewhat different way to remove $CO_2$ from outdoor or atmospheric air and then provide a concentrated $CO_2$ gas stream to an enclosed or confined, interior space 150, such as in a greenhouse, as shown schematically in FIGS. 10A and 10B. (Reference numbers are greater by 100 for elements of the sealable enclosure 110 than are corresponding elements of the sealable enclosure 10 of FIGS. 1-9.)

The sealable enclosure 110, like the sealable enclosure 10, has a vacuum chamber 112 with an inlet 114 for a gas stream and an outlet 116 for a gas stream on opposite walls and one or more stacks 122 of a plurality of cartridges or layers 124. The vacuum chamber 112 preferably need only be a hermetically sealed container. Between the cartridges 124 is a serpentine channel 126 for the flow of gas from the inlet 114 to the outlet 116, with diffusion of the gas through a particulate sorbent (not shown) in a fabric enclosure (not shown) in each cartridge 124. Each cartridge 124 has a stiff rectangular frame 130 (not shown) that is substantially flat and open at its middle and is formed by two attached, identical, substantially flat and open, stiff frame members 132 (not shown) with the shape of the frame. Each frame member 132 has a pair of reinforcing ribs 134 (not shown) extending diagonally across the frame member 132 from the corners of the frame member and being attached to the corners of the frame member and to each other where the ribs 134 cross. A flat, electrical heating element 138 (not shown) extends across the open middle of the frame 130 of one or more, preferably all or most, of the cartridges 124 of the sealable enclosure 110

However, the vacuum chamber 112 of the sealable enclosure 110 of FIGS. 10A and 108, unlike the vacuum chamber 12 of the sealable enclosure 10, need not be vacuum tight, and its upper and lower, valve mechanisms 118A, 118B and 120A, 120B at its inlet 114 and outlet 116, respectively need not be vacuum tight. The sealable enclosure 110 can be used to:

remove $CO_2$ from atmospheric or outdoor air by forcing the air, with a fan 119 (not shown), into and through the open, lower valve mechanisms 118B and 120E of the sealable enclosure 110, so that the $CO_2$ is adsorbed on the sorbent of the cartridges 124 as shown in FIG. 10B: in this step, movement of gas between the sealable enclosure 110 and the space 150 of a building, such as in a greenhouse, is prevented by the closed, upper valve mechanisms 118A and 120A; and then desorb the $CO_2$ on the sorbent of the cartridges by heating the cartridges 124 and forcing, with a fan (not shown), the desorbed $CO_2$ into and through the space 150 as shown in FIG. 10A; in this step, movement of gas between the sealable enclosure 110 and the space 150 is possible through the open, upper valve mechanisms 118A and 120A, and movement of gas between the sealable enclosure 110 and atmospheric air is preferably prevented by the open, lower valve mechanisms 118B and 120B; this provides a gas stream effluent from the upper valve mechanism 120 of the sealable enclosure that is more concentrated in $CO_2$ than is the air in the space 150.

Figure 11A:
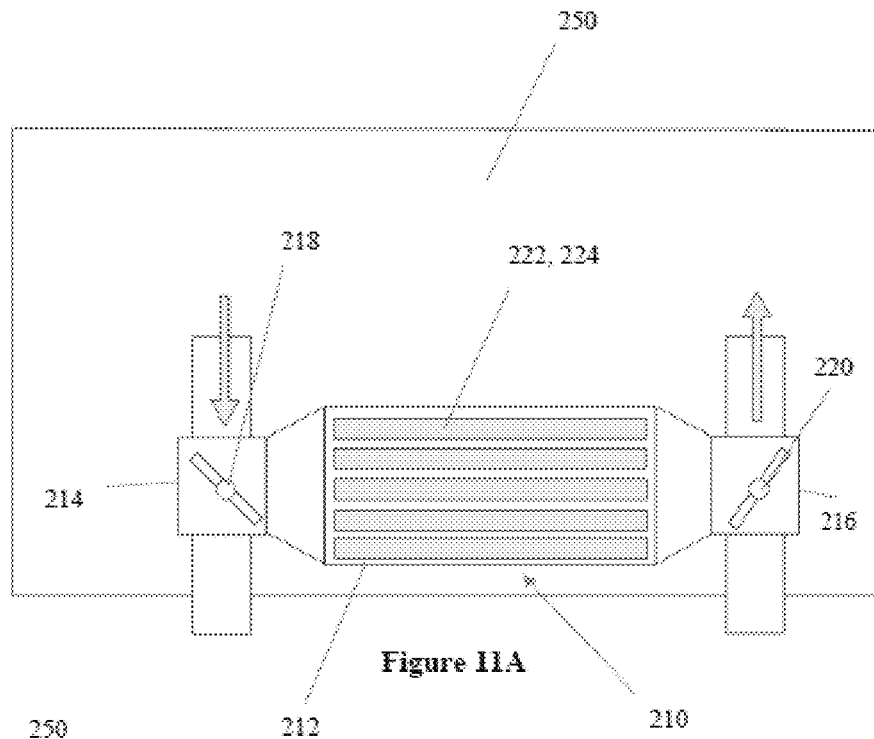
FIGS. 11A and 11B shows schematically the use of another alternative sealable enclosure 210 of this invention for removing $CO_2$ from an enclosed or confined, interior space, particularly of an apartment in a residential building, an office in a commercial office building, a car, a truck, a ship, an airplane or a bus.
Figure 11B:
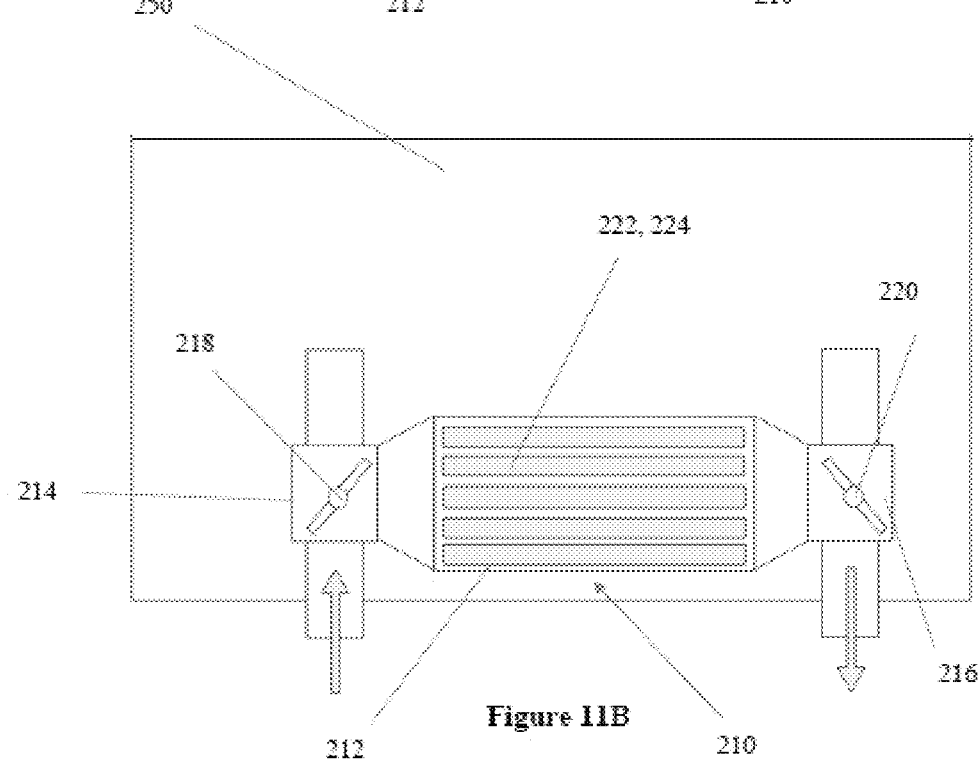

Another lower cost, alternative sealable enclosure 210 of this invention can be used in a somewhat different way to remove $CO_2$ from air in an enclosed or confined, interior space 250, particularly an apartment, office, car, truck, ship, airplane or bus, as shown schematically in FIGS. 11A and 118. (Reference numbers are greater by 200 for elements of the sealable enclosure 210 than are corresponding elements of the sealable enclosure 10 of FIGS. 1-9.)

The sealable enclosure 210, like the sealable enclosure 10, has a vacuum chamber 212 with an inlet 214 for a gas stream and an outlet 216 for a gas stream on opposite walls and one or more stacks 222 of a plurality of cartridges or layers 224. Between the cartridges 224 is a serpentine channel 226 for the flow of gas from the inlet 214 to the outlet 216, with diffusion of the gas through a particulate sorbent (not shown) in a fabric enclosure (not shown) in each cartridge 224. Each cartridge 224 has a stiff rectangular frame 230 (not shown) that is substantially flat and open at its middle and is formed by two attached, identical, substantially flat and open, stiff frame members 232 (not shown) with the shape of the frame.

Each frame member 232 has a pair of reinforcing ribs 234 (not shown) extending diagonally across the frame member 232 from the corners of the frame member and being attached to the corners of the frame member and to each other where the ribs 234 cross. A flat, electrical heating element 238 (not shown) extends across the open middle of the frame 230 of one or more: preferably all or most, of the cartridges 224 of the sealable enclosure 210

However, the vacuum chamber 212 of the sealable enclosure 210 of FIGS. 11A and 118, unlike the vacuum chamber 12 of the sealable enclosure 10, need not be vacuum tight, and two (2) two-way valve mechanisms 218, 220 have been provided at its inlet 214 and outlet 216, respectively, each of which can allow communication between the sealable enclosure and either the interior of the space 250 or the exterior of the space. The sealable enclosure 210 can be used to:

remove $CO_2$ from the air in the space 250 of a vehicle by forcing the air, with a fan 219 (not shown), into and through the valve mechanisms 218, 220, opened to the space 250 and closed to the exterior of the space, so that the $CO_2$ is adsorbed on the sorbent of the cartridges 224 as shown in FIG. 11A; in this step, movement of air between the sealable enclosure 210 and the space 250 through the inlet 214 and outlet 216 is allowed by the valve mechanisms 218, 220, but movement of outdoor air between the exterior of the space 250 and the sealable enclosure 210 through the inlet 214 and outlet 216 is prevented by the valve mechanisms 218, 220, and then desorb the $CO_2$ on the sorbent of the cartridges by forcing, with a fan (not shown), outdoor air, preferably heated, into and through the valve mechanisms 218, 220, closed to the space 250 and opened to the exterior of the space through the cartridges 224, so that $CO_2$ is desorbed from the sorbent of the cartridges 224 as shown in FIG. 118; in this step, movement of air between the sealable enclosure 210 and the interior of the space 250 through the inlet 214 and outlet 216 is prevented by the valve mechanisms 218, 220, but movement of outdoor air between the exterior of the space 250 and the sealable enclosure 210 through the inlet 214 and outlet 216 is allowed by the valve mechanisms 218, 220; this provides a gas stream effluent from the sealable enclosure 210 to the exterior of the space 250 that is concentrated in $CO_2$, thereby regenerating the sorbent of the cartridges 224 for reuse in removing $CO_2$ from the air in the space 250.

Figure 12A:
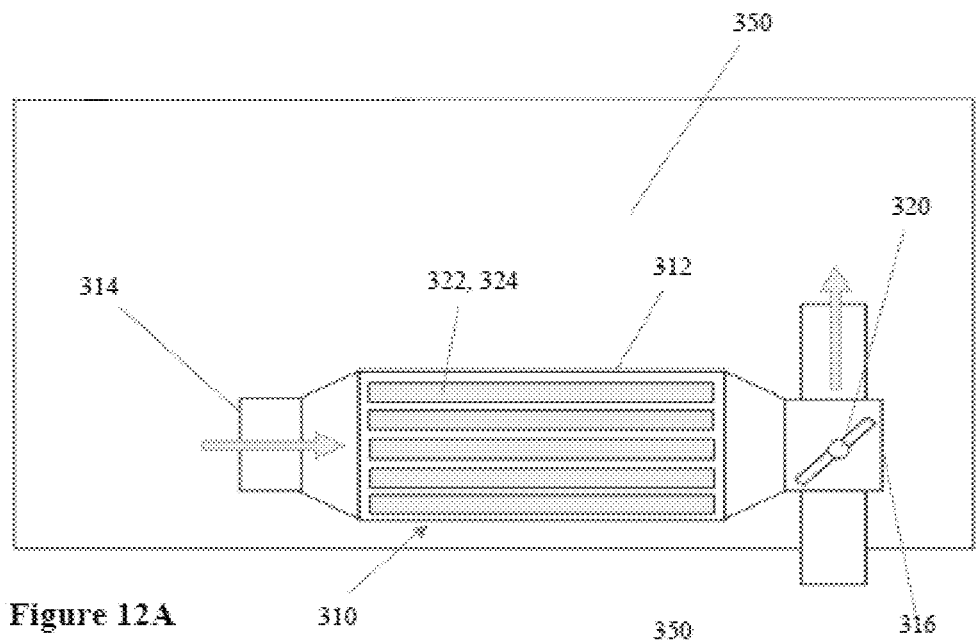
FIGS. 12A and 12B shows schematically the use of another alternative sealable enclosure 310 of this invention for removing $CO_2$ from an enclosed or confined, interior space, particularly of an apartment in a residential building, an office in a commercial office building, a car, a truck, a ship, an airplane or a bus.
Figure 12B:
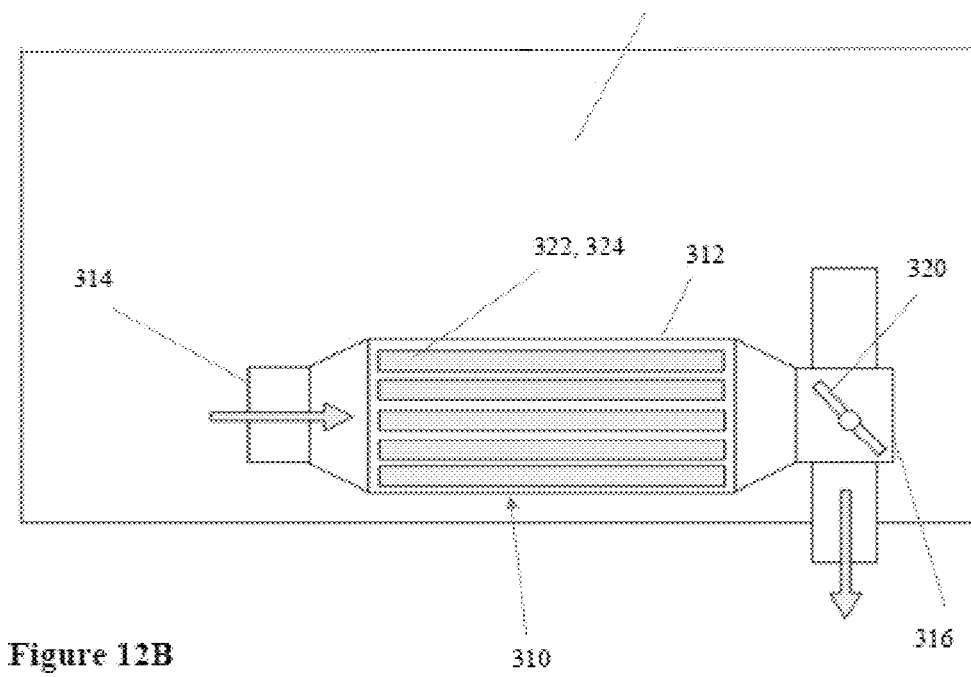

Another lower cost, alternative sealable enclosure 310 of this invention can be used in a somewhat different way to remove $CO_2$ from air in an enclosed or confined, interior space 350, particularly an apartment, office, car, truck, ship, airplane or bus, as shown schematically in FIGS. 12A and 12B. (Reference numbers are greater by 300 for elements of the sealable enclosure 310 than are corresponding elements of the sealable enclosure 10 of FIGS. 1-9.)

The sealable enclosure 310, like the sealable enclosure 10, has a vacuum chamber 312 with an inlet 314 for a gas stream and an outlet 316 for a gas stream on opposite walls and one or more stacks 322 of a plurality of cartridges or layers 324. Between the cartridges 324 is a serpentine channel 326 for the flow of gas from the inlet 314 to the outlet 316, with diffusion of the gas through a particulate sorbent (not shown) in a fabric enclosure (not shown) in each cartridge 324. Each cartridge 324 has a stiff rectangular frame 330 (not shown) that is substantially flat and open at its middle and is formed by two attached, identical, substantially flat and open, stiff frame members 332 (not shown) with the shape of the frame.

Each frame member 332 has a pair of reinforcing ribs 334 (not shown) extending diagonally across the frame member 332 from the corners of the frame member and being attached to the corners of the frame member and to each other where the ribs 334 cross. A flat, electrical heating element 338 (not shown) extends across the open middle of the frame 330 of one or more, preferably all or most, of the cartridges 324 of the sealable enclosure 310

However, the vacuum chamber 312 of the sealable enclosure 310 of FIGS. 12A and 12B, unlike the vacuum chamber 12 of the sealable enclosure 10, need not be vacuum tight. Also, the inlet 314 of the sealable enclosure 310 is open only to the interior of the space 350, and a single two-way valve mechanism 320 has been provided at the outlet 316 of the sealable enclosure 310 which can allow communication between the sealable enclosure and either the interior of the space 350 or the exterior of the space. The sealable enclosure 310 can be used to:

remove $CO_2$ from the air in the space 350 of a vehicle by forcing the air, with a fan 319 (not shown), through the open inlet 314 of the sealable enclosure 310, so that the $CO_2$ is adsorbed on the sorbent of the cartridges 324 as shown in FIG. 12A; in this step, movement of air between the sealable enclosure 310 and the space 350 through the outlet 316 is allowed by the valve mechanism 320, but movement of outdoor air between the exterior of the space 350 and the sealable enclosure 310 through the outlet 316 is prevented by the valve mechanism 320; and then desorb the $CO_2$ on the sorbent of the cartridges by forcing, with a fan (not shown), air, preferably heated, from the space 350 through the open inlet 314 of the sealable enclosure 310, so that the $CO_2$ is desorbed from the sorbent of the cartridges 324 as shown in FIG. 12B: in this step, movement of air between the sealable enclosure 310 and the space 350 through the outlet 316 is prevented by the valve mechanism 320, but movement of outdoor air between the sealable enclosure 310 and the exterior of the space 350 through the outlet 316 is allowed by the valve mechanism 320: this provides a gas stream effluent from the sealable enclosure 310 to the exterior of the space 350 that is concentrated in $CO_2$, thereby regenerating the sorbent of the cartridges 324 for reuse in removing $CO_2$ from the air in the space 350.

The sealable enclosures 10, 110, 210, 310 of this invention can be used in a process for separating and optionally recovering a gaseous component (e.g., $CO_2$) from a gas stream, such as atmospheric or outdoor air or air inside a closed or confined, interior space such as in a building, e.g., in one or more rooms of a house or office building or in a greenhouse, or in a vehicle, e.g., a car, truck, airplane or bus, or an exhaust gas from a chemical (e.g., combustion) or biological process. The sealable enclosures 10, 110, 210, 310 can also be used in a process for separating and recovering $CO_2$ from outdoor air, i.e. air exterior to a closed or confined, interior space, e.g., a greenhouse, or from air in the closed or confined, interior space and providing the recovered $CO$; to the closed or confined space or venting it to the outdoors.

Of course, the sealable enclosures 10, 110, 210, 310 can also be used in other applications, such as for the separation of $CO_2$ from flue gases, exhaust gases, industrial waste gases or for the separation of components other than $CO_2$ from these or other gas streams. The sealable enclosures 10, 110, 210, 310 can be of particular value for supplying a gaseous component, particularly $CO_2$, of a gas stream, particularly atmospheric air, in varying concentrations (e.g., as a function of the demand) to an enclosed space, such as a greenhouse, or for water treatment, fish farms or urban farming. More than one of the sealable enclosures 10, 110, 210, 310 can be connected together and used in combination for various purposes.

The invention claimed is:

1. An apparatus for providing $CO_2$ to a greenhouse or a vivaria in increased concentration for enhancing plant growth, the apparatus comprising:
- a vacuum chamber that contains a sorbent for cyclic adsorption and desorption of $CO_2$, wherein the sorbent is adapted to:
  - i) initially adsorb $CO_2$ from atmospheric air forced into the vacuum chamber to produce atmospheric air of reduced $CO_2$ concentration in the vacuum chamber, and,
  - ii) subsequently be heated to desorb $CO_2$ that the sorbent had adsorbed from the atmospheric air forced into the vacuum chamber and thereby produce atmospheric air of increased $CO_2$ concentration in the vacuum chamber;
- a first inlet of the vacuum chamber to the atmosphere for atmospheric air that is to be forced by a fan into the vacuum chamber;
- a first outlet of the vacuum chamber to the atmosphere for the atmospheric air of reduced $CO_2$ concentration that is to be forced by the fan from the vacuum chamber to the atmosphere;
- a second outlet of the vacuum chamber to the green house or the vivaria for atmospheric air of increased $CO_2$ concentration that is produced by heating the sorbent and is to be forced by the fan from the vacuum chamber to the greenhouse or the vivaria; and
- a second inlet of the vacuum chamber to the greenhouse or the vivaria for air that is to be forced by the fan out of the greenhouse or the vivaria to the atmosphere via the vacuum chamber,
- wherein the first and second outlets of the vacuum chamber comprise a single two-way outlet valve configured to direct air from the vacuum chamber to the atmosphere through the first outlet or to the greenhouse or vivaria through the second outlet wherein when the single two-way outlet valve directs air through the first outlet, the second outlet is blocked and when the single two-way outlet valve directs air through the second outlet, the first outlet is blocked, and
- wherein the first and second inlets of the vacuum chamber comprise a single two-way inlet valve configured to direct air into the vacuum chamber from the atmosphere through the first inlet or from the greenhouse or vivaria through the second inlet wherein when the single two-way inlet valve directs air through the first inlet, the second inlet is blocked and when the single two-way outlet valve directs air through the second inlet, the first inlet is blocked.

2. The apparatus of claim 1, wherein the sorbent is a loose particulate sorbent.

* * * * *